US008387875B2

(12) United States Patent
Truesdale

(10) Patent No.: US 8,387,875 B2
(45) Date of Patent: Mar. 5, 2013

(54) CONTAINER DISPOSAL

(76) Inventor: Julien Truesdale, Christchurch (NZ)

( * ) Notice: Subject to any disclaimer, the term of this patent is extended or adjusted under 35 U.S.C. 154(b) by 60 days.

(21) Appl. No.: 12/999,774

(22) PCT Filed: Jun. 19, 2009

(86) PCT No.: PCT/NZ2009/000117
§ 371 (c)(1), (2), (4) Date: Apr. 11, 2011

(87) PCT Pub. No.: WO2009/154487
PCT Pub. Date: Dec. 23, 2009

(65) Prior Publication Data

US 2011/0186623 A1 Aug. 4, 2011

(30) Foreign Application Priority Data

Jun. 19, 2008 (NZ) ........................................ 569267

(51) Int. Cl.
*G06K 15/00* (2006.01)

(52) U.S. Cl. ........................................................ 235/383

(58) Field of Classification Search .................. 235/375, 235/383, 385, 462.01, 487
See application file for complete search history.

(56) References Cited

U.S. PATENT DOCUMENTS

| | | | | |
|---|---|---|---|---|
| 4,248,389 | A | | 2/1981 | Thompson et al. |
| 4,285,426 | A | | 8/1981 | Cahill |
| 4,443,697 | A | | 4/1984 | Ryan et al. |
| 4,526,096 | A | | 7/1985 | La Barge et al. |
| 4,579,216 | A | | 4/1986 | DeWoolfson et al. |
| 5,074,424 | A | * | 12/1991 | Heilman et al. .............. 215/230 |
| 5,111,927 | A | | 5/1992 | Schulze, Jr. |
| 5,257,741 | A | | 11/1993 | Rode et al. |
| 5,584,413 | A | | 12/1996 | Jung |
| 5,996,887 | A | | 12/1999 | Cai et al. |
| 2006/0178933 | A1 | | 8/2006 | FitzGerald et al. |
| 2007/0145140 | A1 | * | 6/2007 | Yoshimura et al. ....... 235/462.01 |
| 2010/0253480 | A1 | * | 10/2010 | Teeter .......................... 340/10.1 |
| 2012/0227860 | A1 | * | 9/2012 | Jeremiah ........................... 141/1 |

FOREIGN PATENT DOCUMENTS

WO 2008075975 A2 6/2008

OTHER PUBLICATIONS

Exhibit A: PCT International Search Report mailed Sep. 17, 2009 in corresponding PCT application PCT/NZ2009/000117 (not prior art).

* cited by examiner

*Primary Examiner* — Thien M Le
*Assistant Examiner* — Christle Marshall
(74) *Attorney, Agent, or Firm* — Waddey & Patterson, P.C.; Emily A. Shouse

(57) ABSTRACT

A method of providing an incentive for crushing containers prior to disposal by providing a reward for doing so. When a container is substantially crushed a code on the container that was previously unreadable is caused to be readable by a code reading means. In response to reading the code by the code reading means, a reward is provided. The container may be disposed of in a disposal means. The disposal means may include the code reading means and provide the reward. Alternatively the code reading means may be provided, for example, on a mobile phone or other device. The reward may be any item of value such as a prize, token, money, account credit or voucher, for example.

20 Claims, 3 Drawing Sheets

CONTAINER DISPOSAL

FIELD OF INVENTION

The present invention generally relates to the field of waste disposal and in particular to the field of rewarding the crushing of containers.

BACKGROUND TO THE INVENTION

Synthetic material containers present an ever expanding problem to waste management throughout the world. Methods for reducing the size of waste material, or possibly more importantly the volume of space that it fills, have been extensively sought. For example empty aluminium cans can simply be crushed and the physical properties of the can ensure that it remains crushed therefore filling a relatively small volume. The plastic/elastic properties of a number of other types of container means that once crushed containers can readily "uncrush" themselves, thus occupying more space.

Prior art in this area suggests several methods for overcoming this problem. Several examples of bellows/concertina sided containers allowing convenient squashing have been proposed. Furthermore, some of these containers contain integral locking devices to hold the containers in a reduced volume. The locking devices in the prior art vary substantially, including threaded screw and nut arrangements, ratchet type arrangements and moulded male/female protrusion/mouldings that can fit snugly together in a "locked" position.

OBJECT OF THE INVENTION

There would be significant advantage in providing the environmentally aware user of the container with an incentive for crushing the container prior to disposal. Further, it would be an advantage if that incentive was a reward delivered if and when the container had been crushed toward its smallest volume. Preferably, this would allow the container to be disposed of in a suitable manner.

It follows that an object of one embodiment of the invention is to provide a disposal system providing an incentive for crushing containers so that they may be more effectively dealt with from the point of use and towards or during waste management.

The invention, in one embodiment, aims to provide the incentive by delivering a reward to the user when the container has been crushed and, optionally, appropriately disposed of. Further objects will become apparent from the following description.

It is an object of the invention to at least provide the public with a useful choice.

SUMMARY OF THE INVENTION

According to a first aspect of the invention, there is provided a method of providing a reward, the method including the steps of:

- substantially crushing a container to cause a code provided on the container to be readable, the code not being readable when the container is not substantially crushed;
- reading the code with a code reading means; and
- providing an item of value in response to reading the code.

Preferably, the step of substantially crushing a container causes separate parts of a code provided on the container to be associated.

Preferably, the step of substantially crushing a container causes a barcode to be readable.

Preferably, the code reading means is a barcode reader. More preferably, the code is a barcode.

Preferably, the step of substantially crushing a container causes a code carried by an RFID tag to be readable.

Preferably, the code reading means is an RFID tag reader. More preferably, the code is associated with an RFID tag.

Preferably, the code reading means is associated with a personal device. More preferably, the personal device is a personal communication device such as a mobile phone or PDA.

Preferably, the method includes providing a disposal means.

Preferably, the method includes the further step of disposing of the substantially crushed container in the disposal means.

Preferably, the reading of the code occurs substantially simultaneously with the disposing of the substantially crushed container.

Preferably, the code reading means is associated with the disposal means.

Preferably, the disposal means is a bin.

Preferably, the code is unique to each container.

Preferably, the code is dependent on the type of container it is provided on.

Preferably, the step of providing an item of value in response to reading the code only occurs on the first reading of each code.

Preferably, the item of value is dispensed from the disposal means.

Preferably, the item of value is dispensed as a result of the code reading means reading the code and as a result of disposing of the substantially crushed container in the disposal means.

Preferably, the item of value is an account credit, account points, a voucher, a token, cash, a toy, confectionary, a drink, a lottery entry or a random prize.

According to a second aspect of the invention, there is provided a disposal means including a code reading means adapted to read a code on a substantially crushed container, wherein substantially crushing the container results in the code being readable by the code reading means, the code not being readable when the container is not substantially crushed.

Preferably, the disposal means further includes dispensing means for dispensing an item of value.

Preferably, the dispensing means is adapted to dispense an item of value in response to the code reading means reading a code on a substantially crushed container.

Preferably, the disposal means is a bin.

Preferably, the code reading means is a barcode reader. More preferably, the code is a barcode.

Preferably, the code reading means is an RFID reader. More preferably, the code is associated with an RIFD tag.

Preferably, the code reading means is positioned to read the code as the container is inserted into the disposal means.

According to a third aspect of the invention, there is provided a disposal means including an entrance, the dimensions of the entrance being so chosen that a container may pass through the entrance when the container is substantially crushed but may not pass through the entrance when the container is not substantially crushed.

Preferably, the disposal means includes a code reading means adapted to read a code on the substantially crushed container, wherein substantially crushing the container results in the code being readable by the code reading means, the code not being readable when the container is not substantially crushed.

Preferably, the disposal means further includes dispensing means to dispense an item of value.

Preferably, the dispensing means is adapted to dispense an item of value in response to the code reading means reading a code on a substantially crushed container.

Preferably, the disposal means is a bin.

Preferably, the code reading means is a barcode reader. More preferably, the code is a barcode.

Preferably, the code reading means is an RFID reader. More preferably, the code is associated with an RFID tag.

Preferably, the code reading means is positioned to read the code as the container is inserted into the disposal means.

According to a fourth aspect of the invention, there is provided a code reading means adapted to read a code on a substantially crushed container, wherein substantially crushing the container results in the code being readable by the code reading means, the code not being readable when the container is not substantially crushed.

According to a fifth aspect of the invention, there is provided a method of providing a reward, the method including the steps of:

- providing a container adapted to be substantially crushed to cause a code provided on the container to be readable, the code not being readable when the container is not substantially crushed and the code being able to be read by a code reading means; and
- providing an item of value in response to the code being read by the code reading means.

Further aspects of the invention, which should be considered in all its novel aspects, will become apparent to those skilled in the art upon reading of the following description which provides at least one example of a practical application of the invention.

BRIEF DESCRIPTION OF THE DRAWINGS

One or more embodiments of the invention will be described below by way of example only and without intending to be limiting with reference to the following drawings, in which.

BRIEF DESCRIPTION OF PREFERRED EMBODIMENTS OF THE INVENTION

Figure 3:
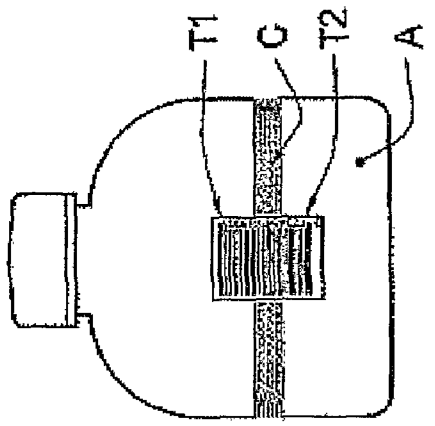
FIG. 3 illustrates the container of FIG. 1 in a substantially crushed configuration.

The invention disclosed herein is a method and means for disposing of containers. In particular, the disposal means is provided with a code reader for reading a code on a substantially crushed container, and providing an item of value.

Reference is made in this specification to a container that is able to be substantially crushed. The container may be any container that is able to be collapsed, so that the container at least occupies a lesser volume than it did prior to collapsing. The terminology is intended in a broad sense to describe any method of reducing the volume of a container by way of squashing, folding, compacting, concertinaing, otherwise compressing, or reshaping in any way. The terminology also describes any other method of reshaping a container. The term "substantially crushed" is not intended to be limiting and may include varying degrees of crushed configurations.

In a typical embodiment, the crushable container has concertina sides; however, it would be possible to crush the container with a twisting type crushing construction or indeed any method for crushing or folding outlined in the prior art. The container may be crushed down the vertical or horizontal axes, or by any other method of crushing or reshaping.

In one embodiment of the invention, the container is provided with a code. Typically, this code will be printed on the container by any known printing, labelling or other such method. The code may be located on the inner or outer surface of the container. In the uncrushed configuration of the container the code includes at least two separate parts printed or otherwise applied to non-adjacent surfaces of the uncrushed container such that the code is unreadable/indecipherable. On partial crushing, the separate parts of the code are not adjacent, and are therefore still unreadable/indecipherable. On substantial crushing, the surfaces on which the parts of the code are applied are brought together and aligned or made adjacent to reveal a readable/decipherable code.

The code printed or applied to the container may be a coded image, barcode, graphical representation, data representation such as number patterns, letter patterns, or other such code. When the parts of the code are separate in the uncrushed configuration of the container the code cannot be read or deciphered. Only when the parts are brought together can the code be read or deciphered.

In an alternative embodiment of the invention, the code is manifested through Radio Frequency Identification (RFID) technology. That is, the container is provided with a RFID tag which carries the relevant code. The code is undetectable by an RFID tag reader until the container is substantially crushed. As a result of substantially crushing the container the code carried by the RFID tag can be read by an RFID tag reader. For the purposes of this embodiment, the code reading means discussed in relation to the invention is a means capable of reading RFID tags. The RFID tag may include a variety of such tags including, but not limited to, passive, active and chipless tags. The code can be encoded on the tag in a variety of ways, and these will be known to those skilled in the art.

For the purposes of describing the invention hereinafter, the code embodied as a barcode will be discussed. A barcode is well-known in the field of retail. However, it will be known to those skilled in the art that the code could equally be embodied as another code such as a graphical image and the invention is not limited only to the use of barcodes as discussed by way of example.

Figure 1:
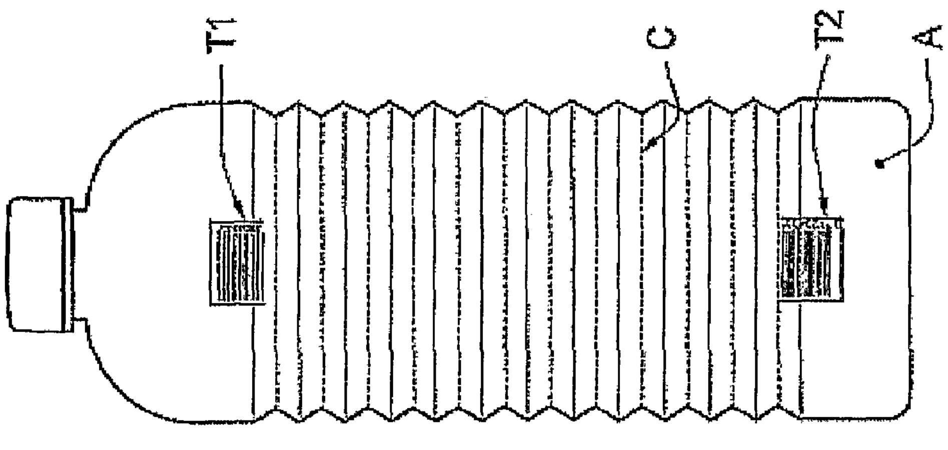
FIG. 1 illustrates a side view of a container including at least two parts of a code printed or otherwise applied to non-adjacent surfaces of the container. In this example, the code is a barcode.

FIG. 1 illustrates an embodiment of a crushable container with a barcode applied. The barcode includes at least two parts T1 and T2 printed or otherwise applied to non-adjacent surfaces of the uncrushed container A and are unreadable/indecipherable.

Figure 2:
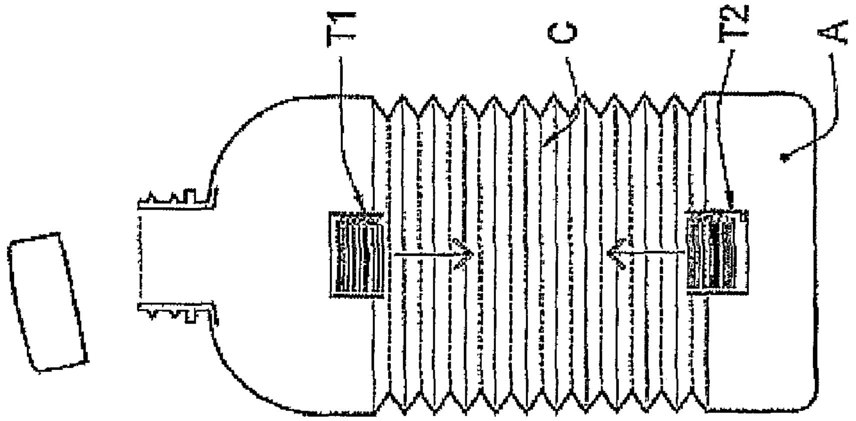
FIG. 2 illustrates the container of FIG. 1 in a partially crushed configuration.

FIG. 2 illustrates the container of FIG. 1 in a partially crushed state, the two parts of the barcode not being adjacent and are therefore still unreadable/indecipherable.

FIG. 3 illustrates the container of FIG. 1 in a substantially crushed state. The separate parts of the barcode are aligned on adjacent surfaces of the container and are readable/decipherable.

In the readable/decipherable state the barcode may be read by a code reading means or reader. A suitable code reading means in the case of a barcode is a barcode reader, such as a scanner. However, in the case of other codes, any form of reader which can read or decipher the code is included in the scope of the present invention.

In one embodiment, the code or barcode is dependent on the class or type of container it is provided on. For example, the barcode on a can is different to the barcode on a bottle, and so on. The reading of the code can differentiate between the classes of container the barcode is provided on.

In one embodiment, each barcode is unique to the container it is provided on.

The crushed container with the barcode is deposited into a disposal means. The disposal means may be a storage or disposal bin or other such receptacle. In one embodiment, the disposal means includes a code reading means such as a barcode reader. The barcode reader is positioned in any position on the disposal means so that the barcode is read by placing the substantially crushed container approximate to the barcode reader with the barcode in a position such that the barcode is read. In one embodiment, the barcode is read before the container is deposited in the disposal means. In an alternative embodiment, the barcode reader is positioned such that the barcode is read as the container is disposed in the disposal means. That is, in this embodiment, the reading of the barcode by the barcode reader occurs substantially simultaneously with the step of disposing of the container.

In an alternative embodiment, the code reading means, or an additional code reading means, is not associated with a disposal means. The code reading means may, in this embodiment, be positioned at a distance from the disposal means. In this embodiment, the code is read by the code reading means before the container is deposited in the disposal means. In other embodiments, the container may not be deposited in a disposal means.

As a result of the barcode being read by the code reading means, an item of value is identified and provided. A number of possibilities of a method by which an item of value is provided are included within the scope of the invention. Several examples of such possibilities are discussed below by way of non-limiting example. It will be apparent to one skilled in the art that other methods of providing an item of value are possible according to the invention.

The code reading means may be any means capable of reading a code, such as a barcode reader or RFID reader. The code reading means may be disposed in any suitable location or form part of any other device. In one embodiment, for example, the code reading means is a barcode scanner associated with a mobile phone, PDA or other such personal device, including personal communication devices. This has an advantage in that anyone can use their personal device to scan a crushed container irrespective of their location. Also, if a reward is to be received as a result of the scanning, the reward can also be delivered to the personal device. For example, a user may crush a container and scan the barcode using a barcode scanning device on their mobile phone. If they are then lucky enough to gain a reward as a result they can receive it on their mobile phone, for example as an SMS message, MMS message, email or other similar communication. In another embodiment, the code reading means is located on a disposal means as described below. Alternatively, the code reading means may be located in a public place, such as a bar or near a public disposal means, such as a recycling bin, for convenience of scanning the crushed container.

In one embodiment, the item of value is dispensed from the disposal means. The dispensing of the item of value occurs in response to the reading of the barcode. The dispensing may also require that the substantially crushed container is disposed of in the disposal means. In this embodiment, the disposal means includes a dispensing means. Dispensing means such as are commonly used in prize machines and vending machines are well-known and shall not be discussed in more detail herein. The dispensing means is activated and dispenses the item of value on account of the reading of the barcode by the code reading means. As discussed below, in one embodiment an item of value is not dispensed following every reading of a barcode. In this embodiment the disposal means includes a processor to process the event of reading a barcode and decide in consequence whether an item of value is dispensed or not.

Figure 4:
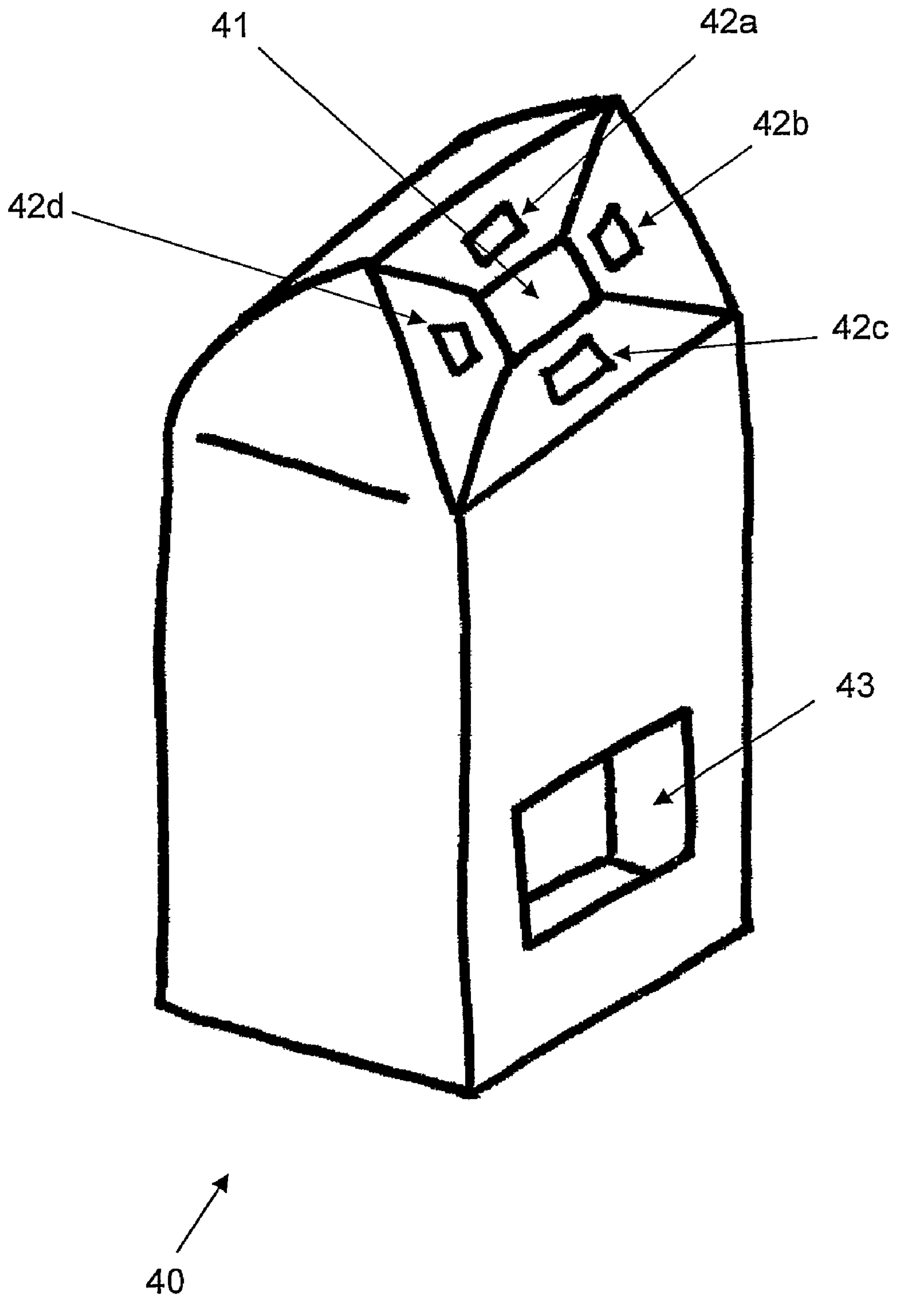
FIG. 4 illustrates a disposal means according to one embodiment of the invention.

FIG. 4 illustrates a disposal means according to one embodiment of the invention. In FIG. 4, bin 40 has an entrance 41 and code reading means 42*a*, 42*b*, 42*c* and 42*d*. The code readings means are situated such that as a substantially crushed container such as illustrated in FIG. 3 is inserted into the entrance 41 the barcode on the container will be read by one of the code reading means. The configuration of FIG. 4 is provided by way of example only and is in no way limiting of the scope of the invention. Any number of code reading means may be provided and, as previously discussed, the code reading means can be situated away from the disposal means.

FIG. 4 also illustrates bin 40 including dispensing outlet 43 such that the prize dispensed by the dispensing means can be retrieved from dispensing outlet 43.

In one embodiment of the invention, entrance 41 is covered by a flap or door or is otherwise blocked. When a barcode is scanned on one of the code reading means 42 the flap is opened allowing the container to be disposed of within the bin 40. This reduces the amount of rubbish entering the bin that is not of the requisite type, to ensure the contents are less contaminated for recycling purposes.

The item of value dispensed may be any number of possible prizes such as a voucher, a token, cash, confectionary, toys, lottery cards, drinks or any other prizes. The disposal means may not dispense an item of value as a result of the reading of every barcode. In one embodiment, whether an item of value is dispensed is randomised or subject to probability restrictions. As a non-limiting example, only one in every one hundred barcode scans may result in an item of value being dispensed. Alternatively, a number of barcodes are pre-associated with prizes such that only when these barcodes are read a prize is dispensed. In another embodiment, the nature of the item of value is dependent on the type of container.

Each barcode may only be read once to result in the dispensing of an item of value, or to provide an opportunity for dispensing an item of value. This avoids the possibility of a user repeatedly scanning a barcode on the barcode reader to attempt to win numerous items of value.

In an alternative embodiment, the item of value is a number of points such as account points or account credit that may be redeemed. In this embodiment, the reading of the barcode by the code reading means results in an account being credited with points or credit. Each container is worth a number of account points or account credits and the corresponding number is added to the account. On reaching various numbers of credits, the credits may be exchanged for another item of value, such as a prize, cash, voucher and other such items. In this embodiment, the account is credited following every reading of a barcode, but this does not have to be the case.

In this embodiment, a user has a disposal points account and upon scanning the barcode their account is credited accordingly. The way in which the correct account is credited can be by way of any of a number of methods. For example, a personal identifier such as a PIN or account number can be entered in association with scanning the barcode on the code reading means. The code reading means includes an input means such that user information can be entered. When a user scans the barcode with the code reading means they are prompted to enter their personal identifier, for example their PIN number, into the input means.

The points associated with the container code scanned are therefore credited to that particular user's account. In this embodiment, the code reading means is connected to a communications network, such as the internet, so that the event of the user disposing of a container can be recorded and that user's account can be updated. Alternatively, the code reading means can store this information for uploading to a database at a later time. Alternatively, the user can enter their personal identifier before scanning the barcode.

In an alternative embodiment, points are credited to any user's account, the account not being restricted to the user's account. In one embodiment, a user can nominate a selected nominee whose account is credited when a container code is scanned. By way of non-limiting example, a user may wish to nominate a charitable account such as a local hospital or other charity so that the nominee's account is credited and the nominee is benefited. Any other user can be nominated in such a way. This is achieved in one embodiment by the user establishing a direct credit link to the nominee's account such that all or some of the containers scanned by the user result in credit being added to the nominee's account. In an alternate embodiment, the user may use an identifier which is associated with the crediting of a nominee's account rather than the user's own account. Other such methods of crediting another user's account, or allowing another user or entity to be the beneficiary of the item of value will be known to those skilled in the art.

In one embodiment, user account information such as the account credit balance is accessed online. A user logs on using a user name and password to a website and can view their account activity and account credit on the website. The website may also provide easy access to ways of redeeming credit in exchange for other items of value. Alternatively, other methods of accessing account information is also provided for, including via telephone, post and any other known method of accessing such information.

The invention is not limited to any particular method of accessing account credit or an item of value provided. Any method of accessing the account credit or item of value is included within the scope of the invention, including access from any location or at any time following the step of providing the item of value. Furthermore, any method of providing an item of value or account credit and to any user or person is also included. Those methods discussed herein are included by way of non-limiting example only.

In an alternative embodiment, a disposal means such as a bin includes an entrance such as an aperture or entry compartment of such dimensions that an uncrushed or partially crushed container does not fit through the entrance in order to be able to be disposed of in the disposal means. Only in the substantially crushed configuration will the container be able to be disposed of in the disposal means.

The requirements of the size of the dimensions of the entrance will be dependent on the size of the dimensions of the container in both its uncrushed and substantially crushed configurations. The invention is non-limiting in terms of the size and dimensions of the container. Typically, containers from the same source or sold in the same location will be of substantially similar dimensions, and therefore disposal means located in those areas in this embodiment will be included of an entrance of appropriate size and dimensions. It will be obvious to any person skilled in the art as to the necessary size and dimensions of an entrance in a disposal means required to achieve the result of allowing a container to fit through in its substantially crushed configuration but not in its partially or non-crushed configurations without the need of any inventive ingenuity.

Figure 5:
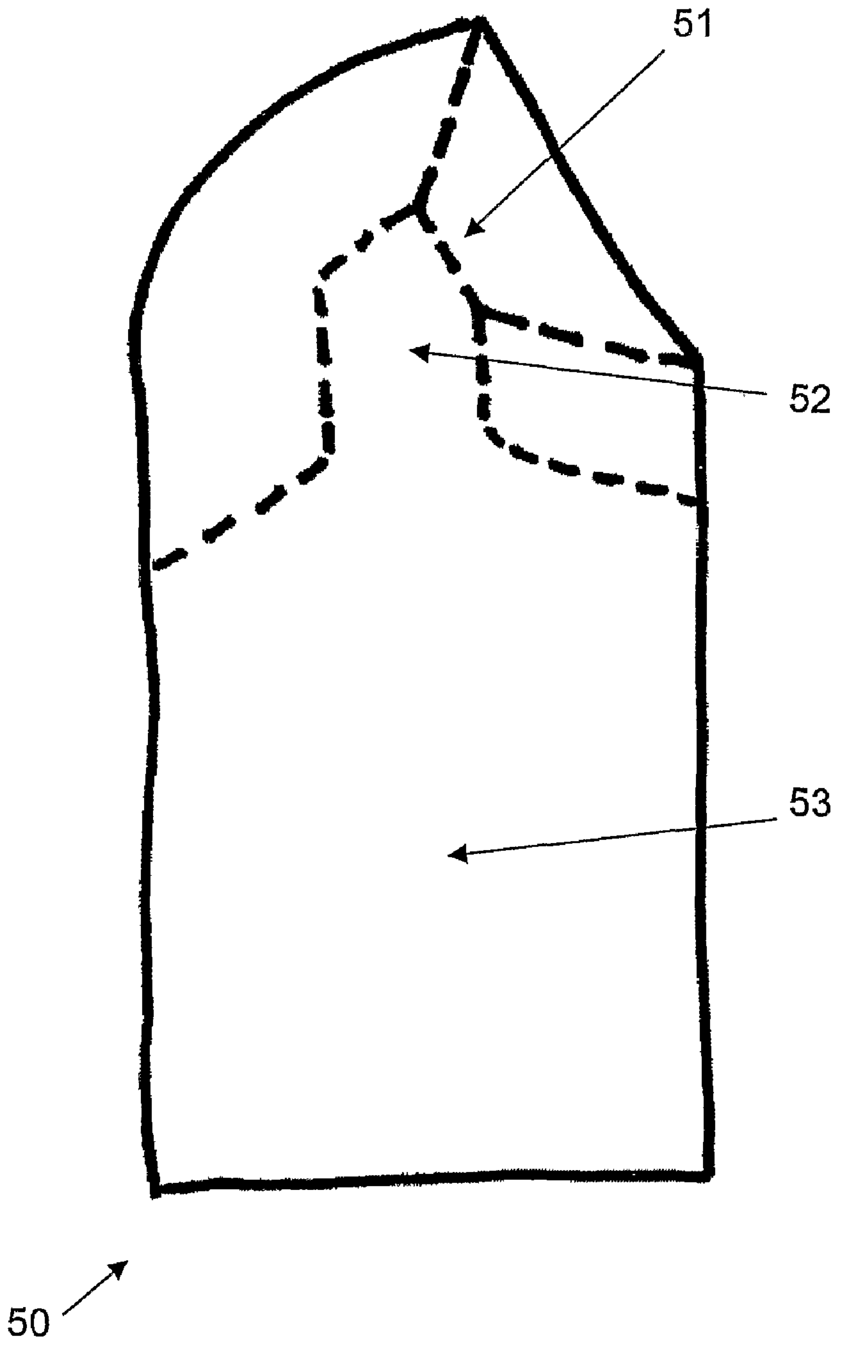
FIG. 5 illustrates a cross-sectional view of a disposal means according to one embodiment of the invention.

FIG. 5 illustrates a cross-sectional view of a disposal means in one embodiment of the invention. In FIG. 5, bin 50 includes entrance 51, passage 52 and chamber 53. The configuration of bin 50 is such that only a substantially crushed container such as illustrated in FIG. 3, and not a non-crushed container as illustrated in FIG. 1 or a partially crushed container as illustrated in FIG. 2, can pass through entrance 51 and passage 52 into chamber 53. In this embodiment, a user must therefore substantially crush a container to be able to dispose of it in bin 50.

The code reading means and disposal means may be located in a number of places, such as public areas, bars, pubs, homes, or any other location where containers could be disposed of.

Wherein the foregoing description reference has been made to integers or components having known equivalents thereof, those integers are herein incorporated as if individually set forth.

It should be noted that various changes and modifications to the presently preferred embodiments described herein will be apparent to those skilled in the art. Such changes and modifications may be made without departing from the spirit and scope of the invention and without diminishing its attendant advantages. It is therefore intended that such changes and modifications be included within the present invention.

The invention claimed is:

1. A method of providing a reward, the method including the steps of:

substantially crushing a container to cause a code provided on the container to be readable, the code not being readable when the container is not substantially crushed;

reading the code with a code reading means; and providing an item of value in response to reading the code.

2. A method as claimed in claim 1, wherein the step of substantially crushing a container causes separate parts of a code provided on the container to be associated.

3. A method as claimed in claim 1, wherein the code reading means is a barcode reader and the code is a barcode.

4. A method as claimed in claim 1, wherein the code reading means is an RFID tag reader and the code is an RFID tag.

5. A method as claimed in claim 1 including providing a disposal means.

6. A method as claimed in claim 1, wherein the reading of the code occurs substantially simultaneously with disposing of the substantially crushed container in a disposal means.

7. A method as claimed in claim 5, wherein the code reading means is associated with the disposal means.

8. A method as claimed in claim 1, wherein the code is unique to each container or and/or dependent on the type of container it is provided on.

9. A method as claimed in claim 1, wherein the step of providing an item of value in response to reading the code only occurs on the first reading of each code.

10. A method as claimed in claim 1, including dispensing the item of value from a disposal means into which the substantially crushed container is disposed.

11. A method as claimed in any claim 1, wherein the item of value is dispensed as a result of the code reading means reading the code and as a result of disposing of the substantially crushed container in the disposal means.

12. An apparatus including a code reading means adapted to read a code on a substantially crushed container, wherein substantially crushing the container results in the code being readable by the code reading means, the code not being readable when the container is not substantially crushed.

13. The apparatus of claim 12, including disposal means for disposing of the substantially crushed container.

14. The apparatus of claim 12 including dispensing means for dispensing an item of value.

15. The apparatus as claimed in claim 14, wherein the dispensing means is adapted to dispense an item of value in response to the code reading means reading a code on a substantially crushed container.

16. The apparatus as claimed in claim 12, wherein the code reading means is a barcode reader and the code is a barcode.

17. The apparatus as claimed in claim 12, wherein the code reading means is an RFID tag reader and the code is an RFID tag.

18. The apparatus as claimed in claim 13, wherein the code reading means is positioned to read the code as the container is inserted into the disposal means.

19. The apparatus as claimed in claim 13, further comprising an entrance, the dimensions of the entrance being so chosen that a container may pass through the entrance when the container is substantially crushed but may not pass through the entrance when the container is not substantially crushed.

20. A method of providing a reward, the method including the steps of:

providing a container adapted to be substantially crushed to cause a code provided on the container to be readable by a code reading means, the code not being readable when the container is not substantially crushed; and providing an item of value in response to the code being read by the code reading means.

* * * * *

UNITED STATES PATENT AND TRADEMARK OFFICE

CERTIFICATE OF CORRECTION

PATENT NO. : 8,387,875 B2
APPLICATION NO. : 12/999774
DATED : March 5, 2013
INVENTOR(S) : Julien Truesdale It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 172 days.

Signed and Sealed this
First Day of September, 2015

Michelle K. Lee
*Director of the United States Patent and Trademark Office*